INVENTOR:
ADRIANUS W. VAN GILS

Dec. 5, 1967  A. W. VAN GILS  3,355,939
APPARATUS FOR MEASURING THE DIFFERENCE BETWEEN HYDROSTATIC
AND FORMATION PRESSURE IN A BOREHOLE
Filed Sept. 22, 1964  3 Sheets-Sheet 3

INVENTOR:
ADRIANUS W. VAN GILS
BY:
HIS ATTORNEY

United States Patent Office 3,355,939
Patented Dec. 5, 1967

3,355,939
APPARATUS FOR MEASURING THE DIFFERENCE BETWEEN HYDROSTATIC AND FORMATION PRESSURE IN A BOREHOLE
Adrianus W. van Gils, Seria, Brunei, Borneo, assignor to Shell Oil Company, New York, N.Y., a corporation of Delaware
Filed Sept. 22, 1964, Ser. No. 398,227
3 Claims. (Cl. 73—152)

ABSTRACT OF THE DISCLOSURE

An apparatus for measuring the difference between hydrostatic pressure and formation pore pressure existing in a borehole. The apparatus includes a cylinder having a piston disposed therein with a measurement being made of the pressure required in addition to the pore pressure to move the piston in opposition to the hydrostatic pressure.

---

This application is a continuation-in-part of United States patent application, Serial No. 273,528, filed April 16, 1963, and now abandoned.

This invention relates to a method and apparatus for measuring the difference between the hydrostatic pressure and the formation pore pressure existing in a borehole. More particularly, this invention relates to a method and apparatus for recording this pressure differential at the surface without requiring the removal of drilling or other tools from the borehole.

In most cases when drilling a hole into the earth, for example, an oil well, the portion of the hole already drilled must be filled with a fluid or mud which, by it hydrostatic pressure and by having the property of building up a thin nearly impermeable mud cake against the wall of the hole, prevents the hole from caving in and at the same time prevents oil, gas and other formation fluids from entering the borehole by way of the formation pores. Usually this fluid or mud consists of water or oil to which a substance has been added to increase its density and thereby the hydrostatic pressure exerted by this fluid column.

In order to achieve the above-mentioned desired results and also to prevent the well from blowing out, for example while drilling or round tripping to change the bit, it is generally considered good practice to maintain the pressure differential between the hydrostatic pressure exerted by the mud column and the formation pore pressure at not less than 200 p.s.i. in order to insure safe operations.

It is well known however that the drilling or penetration rate of a well increases as the density of the mud being used decreases and consequently as light a mud as possible should be used or in other words, the above-mentioned pressure differential should be as small as possible for maximum drilling efficiency. Moreover, not only is the penetration rate largely dependent on this pressure differential but also too great a pressure differential often causes drilling tools to get stuck against the wall of the borehole. Therefore, the pressure differential between the mud column pressure and formation pressure should, if possible, be maintained at the minimum safe pressure differential (200 p.s.i.) to make operations both as safe and as efficient as possible.

In order however to operate as close as possible to this pressure differential, it is essential to know the extent of the pressure difference during all sorts of operations in a borehole at any moment and while drilling or other tools are still in the hole.

Accordingly, it is the object of this invention to provide an apparatus having the following features and general characteristics for the direct recording and registering at the surface of the pressure difference between the hydrostatic pressure and the formation pore pressure while the drilling or other tools are in the hole.

The apparatus can be placed between the drill collars and drilling bit during drilling operations or between sections of drill pipe, tubing or other component parts; it then forms an integral part with the tools lowered into the hole.

For drilling operations the apparatus is connected as close to the bottom of the drill string as possible for practical reasons. However this does not exclude the possibility to take readings higher up in the hole by raising the drill string.

The outside diameter of the apparatus has the same or larger outer diameter than the tool on which it is run into the hole.

The apparatus is preferably run into the hole close to a drilling bit or near a solid centralizer or stabilizer in order to keep the apparatus in the center of the hole.

A portion of the apparatus is slidable in a transverse direction and is pressed against the wall of the borehole, its front face having the shape of a funnel is turned outward so as to provide a sensing chamber for the prevailing pore pressure.

The outer surface of the funnel shaped portion is cylindrical and follows the circumference of the borehole so that each point of the edge of this portion comes in contact with the wall of the hole at the same moment and under the same pressure.

Centrally mounted within the movable funnel shaped portion is a piston which is responsive to the various pressures existing in the borehole and to a known measuring pressure.

The operation of the invention is briefly as follows:
The drill pipe is closed off below the apparatus so that pressure can be built up inside the drill pipe by injecting water at the surface. By means of the pressure built up inside the drill pipe, an aperture is opened and the funnel-shaped member including the piston is moved against the wall of the borehole by means of the pressure in the drill pipe and remains pressed against it until released. The pressure inside the drill pipe is gradually increased until the piston in the center of the funnel-shaped member moves away from the wall of the borehole. The force or pressure required to move the piston is proportional to the pressure differential between the hydrostatic head and the formation pressure.

In order to move the piston in the funnel-shaped member away from the wall of the borehole and to apply the hydraulic force required, this piston is attached to a larger piston, forming a dual piston. Only hydrostatic pressure prevails on the one side of the larger piston and the hydrostatic pressure plus the known hydraulic pressure, as exerted on the drill pipe at the surface, prevails on the surface of the larger piston which is attached to the piston in the funnel-shaped member.

An example of the execution of the invention will now be explained with the help of the drawings wherein.

Figure 1:
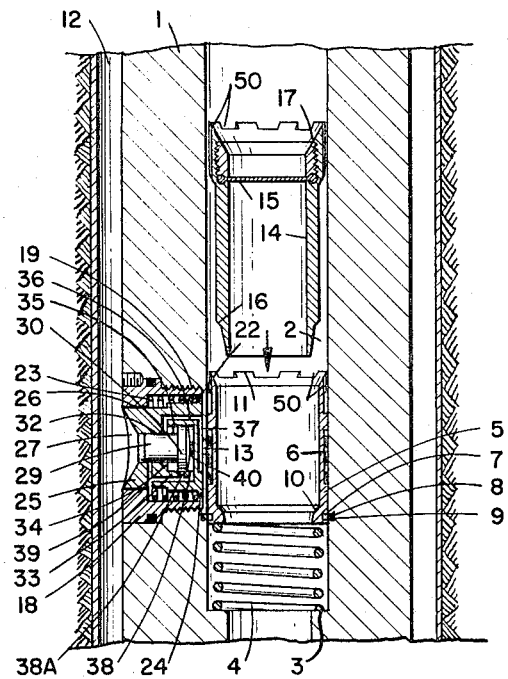
FIGURES 1, 2, 3 and 4 are cross sectional views showing a preferred embodiment of the apparatus according to the invention in four different positions during the operation within a borehole.

Referring now to FIGURES 1–4 of the drawings, there is shown a cylindrical collar or section of pipe 1 which forms the outer portion of the apparatus and has the same outer diameter as the tool, drill collars etc. on which it is run down into the borehole. The collar 1 is provided with a central bore 2, the upper portion of which has the same inner diameter as the smallest inner diameter of the drill pipe or tubulars to which it is attached and the lower portion of which has a slightly reduced diameter.

Mounted within the bore 2 is a relatively weak helical spring 4 having its lower end supported on a ledge 3. In the illustrated example, the spring 4 requires a load of 30 to 50 p.s.i. from the moment compression of the spring begins until it is fully compressed. Also mounted within the bore 2 is a sliding sleeve 5 having its lower surface resting on the upper end of the spring 4. The sleeve 5 is provided, on its outer surface, with a packing or sealing ring 6 which fits tightly against the wall of the bore 2 and provides a fluid seal between the sleeve and the walls of the bore 2. The sliding sleeve 5 is also provided on its periphery with an encircling groove 7 containing an expanding lock spring 8 which normally also engages an encircling groove 9 in the wall of the bore 2. In the illustrated example, the force required to unlock this spring 8 is 350 p.s.i.

The sliding sleeve 5 furthermore is provided with an inner conical seat 10 near its lower end, an inner conical seat 11 at its upper end, and a plurality of slits 50 on the outer circumference at the top end. While drilling, the mud stream can thereafter flow with only a slight pressure drop, from the surface through bore 2 and sliding sleeve 5 as far down as the drilling bit and then continue upwards through the annular space 12 between the drill collars and the wall of the borehole.

Figure 2:
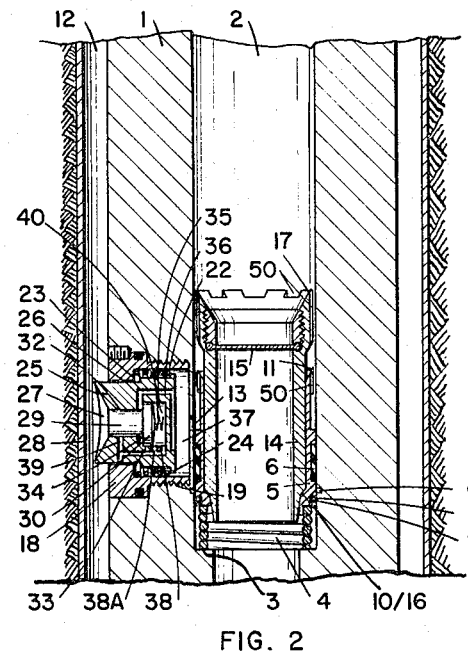

Normal to the longitudinal direction of the collar 1 is a transverse bore or cavity 19 which is only connected with the bore 2 by a small aperture 13. The apparatus for actually performing the measurements is mounted within this cavity 19 and a description thereof is given below. The small aperture 13 is normally sealed off from communication with the bore 2 by the tight fitting packing or sealing ring 6 on the sliding sleeve 5 (FIGURE 1). When recording is to take place, the small aperture 13 is opened by moving the sliding sleeve 5 in a downward direction in the following manner:

A bushing or go-devil 14 having its top sealed off by a breaking plate or diaphragm 15 which is clamped, to the bushing 14, for example, by a screwed cylindrical connection, is lowered into the drill pipe. Although the bushing 14 has sufficient play in the drill pipe or other tubular in which it is dropped to permit it to travel therealong, the mud stream, as it is pumped through the drill pipe by the mud pump at the surface, will force the bushing down through the drill string. Upon reaching the sliding sleeve 5, the bushing 14 will seat itself on the conical seat 10 at the bottom of the sliding sleeve 5 and thereby seal off the lower portion of the drill pipe or tubular. If the hydraulic pressure is then increased at the surface to 350 p.s.i., the lock spring 8 will snap out of the groove 9 and the sliding sleeve 5 will then be forced in a downward direction compressing the cylindrical spring 4. The position thus obtained is shown in FIGURE 2. The sealing ring 6 around the sliding sleeve 5 has then moved sufficiently downward to open the aperture 13 and the mud in the drill pipe can now flow via the slits 50 in the outer circumference of the bushing 14 through the aperture 13. Thereupon the recording takes place as is described below.

After the recording at a particular depth has been completed i.e., one or more reading taken, the measuring apparatus can be deactivated by increasing the pressure in the upper portion of the drill pipe until the plate 15 in the bushing 14 breaks, whereupon the pressure holding the sleeve 5 down is released, causing the spring 4 to force the sliding sleeve 5 upward to close the aperture 13 and finally become locked in place again by the lock spring 8 engaging the groove 9. Drilling can then be continued.

When a new recording is to take place at a greater depth, a second sealed bushing 14 with breaking plate 15 is lowered into the drill pipe. The bottom seat of the second bushing fits tightly on the seat 17 at the top of the bushing 14 which was the first to be lowered. Now the two bushings with the sliding sleeve 5 can be pressed downward and the aperture 13 again opened.

As mentioned before, opening of the small aperture 13 gives access of the mud to the sensing or measuring apparatus, a description of which is given below.

Figure 3:
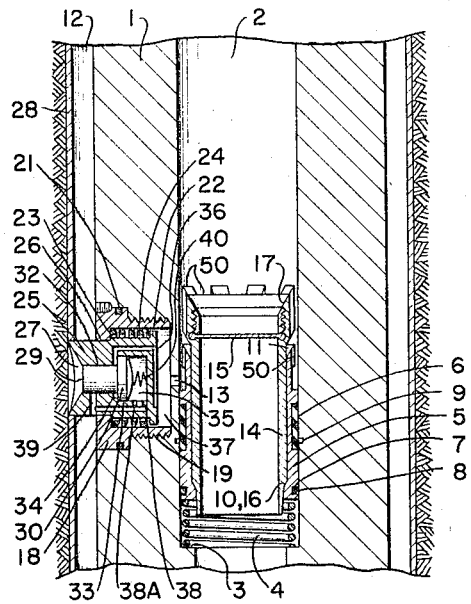

The sensing apparatus has a hollow sleeve 18 which is mounted, in fluid tight relationship, in the transverse cavity 19. Inside the sleeve 18 is mounted a helical spring 22 having one end thereof bearing against a shoulder 23 formed on the inner surface of the sleeve 18. Engaging the other end of spring 22 is the edge 24 of a plunger or piston cylinder 25. The outer diameter of this edge 24 is smaller than the inner diameter of the sleeve 18. In its longitudinal direction, the plunger 25 is provided around its periphery with a ring 26 made of material which provides a good liquid seal and is conducive to sliding, for example, Teflon or nylon. The outer portion of the plunger 25, i.e., the portion facing the wall of the wellbore, is concavely hollowed, thus forming a funnel-shaped chamber 27 resembling an ordinary sucker in which the pressure of the fluid or gas present in the formation prevails during recording, i.e., when the plunger is pushed to the outside by the inflow of mud through the aperture 13 as illustrated in FIGURE 3. The plunger's edge will then have pierced the mud cake 28 on the wall of the borehole.

Movably mounted within the hollow plunger or cylinder 25 is a dual piston 29–30. The circumferences 32 and 33, respectively, of these pistons are also covered by a material which provides a liquid seal and is conducive to sliding. In the preferred embodiment, the surface area of piston 30 in the chamber 35 which is formed between the piston 30 and the head of the plunger 25, is 1½ times as large as the area of piston 29 in chamber 27 and the effective area of piston 30 in chamber 34 which is situated at the junction of pistons 29 and 30, is one-half the piston area in chamber 27. These ratios are preferred but others may also be used.

Connected to the head of piston 30 is a small spring 40 which functions to bring the dual piston 29–30 to its original position after any recording.

A channel, 36 formed in the wall of plunger 25 connects chamber 34 to a chamber 37 formed between the head of plunger 25 and the wall defining the end of cavity 19, and thus effectively connects chamber 34, via the aperture 13, with the bore 2 during recording. Also formed in the wall of the plunger 25 is another channel 38 having one end thereof discharging into chamber 35 near the head of plunger 25 and a second channel 38A having one end thereof in open communication with channel 38 and its other end opening into the interior of plunger 25 at a distance from the head of plunger 25 slightly greater than the length of piston 30. Channel 38A is therefore closed off when piston 30 is in its normal position, i.e., the position dictated by spring 40.

Figure 4:
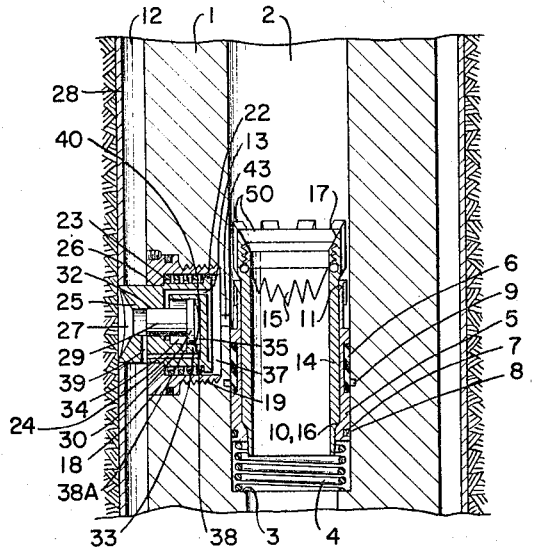

The second end of channel 38 is in open communication with a channel 39 one end of which, as shown in FIGURES 1, 2, and 3 is normally sealed off by the piston 29, but may be connected to the recording chamber 27 as shown in FIGURE 4. The other end of channel 39 may take up three positions: (1) it may be connected with the space containing the helical spring 22 as in FIGURE 1; (2) it may be closed off as in FIGURE 2; or (3) it may discharge into the annular space 12 between the apparatus and the wall of the borehole.

The actual sensing takes place as follows:

After the aperture 13 has been opened, mud enters through the aperture into the cavity 37 and causes the plunger 25 to move outward contrary to the force of the helical spring 22 which requires a pressure of 60 p.s.i. at the beginning of the compression and a pressure of 80 p.s.i. at the end of its compression. At the same time mud enters between the coils of the helical spring 22 and moves through channel 39 and from there through channel 38 behind the large piston 30. The mud also enters chamber 34 between the two pistons 29 and 30 by means of channel 36. The pistons are pushed outward by the resulting force caused by the prevailing pressure difference behind both pistons in chambers 34 and 35 and the hydrostatic pressure in the annulus 12. As those pistons do not have to oppose the force of the helical spring 22 as is the case with plunger 25 they will move outward to their utmost position prior to further movement of the plunger 25 and before the plunger 25 has closed channel 39. Because of this additional force required to overcome spring 22, plunger 25 moves after pistons 29–30 have reached their utmost position. The various parts will then take up the positions as shown in FIGURE 2. In this position channel 39 is closed off at both ends.

Plunger 25 then continues its move outwardly along with the dual piston 29–30 until such time as the outer edge of the plunger reaches the wall 28 of the borehole.

In this position (FIGURE 3) the following pressures and forces prevail:

*Firstly.*—A hydraulic pressure plus the hydrostatic pressure caused by the column of mud in the drill string between the aperture 13 and the surface prevails behind plunger 25 in chamber 37 and only the hydrostatic pressure prevails against the piston 29 in chamber 27 of the funnel-shaped member.

As pointed out above, helical spring 22 requires a pressure of 80 p.s.i. to completely compress the spring and force the plunger 25 toward the wall of the wellbore. Additionally, about 20 p.s.i. hydraulic pressure applied to the surface area behind the plunger 25 in chamber 37 is considered sufficient force to pierce the mud cake 28 and to isolate chamber 27 from the annular space 12. Consequently, the hydraulic pressure, which is applied at the surface, must be 100 p.s.i. in order to operate the recorder.

*Secondly.*—In chamber 34, between the dual piston 29–30, the hydrostatic pressure plus the 100 p.s.i. hydraulic pressure required to hold the plunger 25 against the wall of the borehole prevails since chamber 34 is connected with chamber 37 at the head of plunger 25 by channel 36.

As shown in FIGURE 3, when the funnel-shaped member of the plunger 25 has penetrated the wall cake 28 sufficiently, channel 39 is then opened, connecting chamber 35 with the annular space 12 where hydrostatic pressure of the mud column prevails.

The prevailing hydraulic overpressure of 100 p.s.i. in chamber 34 then forces piston 30 to move slightly to the inside, resulting in a very small movement of piston 29 in chamber 27 and causing the pressure in chamber 27 behind piston 29 to drop to the prevailing formation pore pressure.

According to the preferred embodiment of the invention, in order now to get an indication of the difference between pore pressure and hydrostatic pressure, it is necessary to move the dual piston 29–30 toward the head of the plunger 25, i.e., away from the wall of the borehole. In order to move the pistons 29–30 in this manner, a force is required which will overbalance the force exerted by the hydrostatic pressure behind piston 30 in chamber 35 minus the force exerted by the pore presssure behind piston 29 in chamber 27 which forces are opposing each other. In other words: the force exercised against piston 30 in chamber 34 should overbalance the force exerted against piston 30 in chamber 35 caused by the differential pressure between the hydrostatic head and the formation pore pressure.

Figure 6:
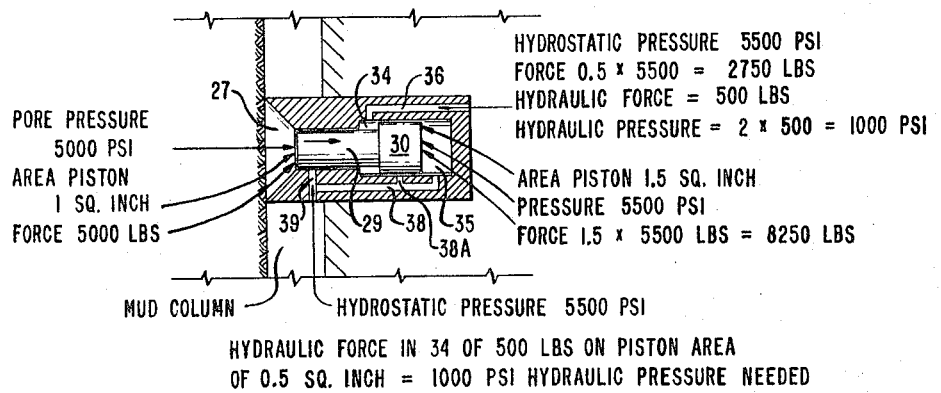
FIGURE 6 illustrates the forces and pressures exerted on the apparatus of FIGURES 1–4 at a hydrostatic pressure of 5500 p.s.i. and a pore pressure of 5000 p.s.i.; and, FIGURE 7 illustrates the course of the pressure in the well during operation of the apparatus.

As shown in FIGURE 6, with a ratio of areas of piston 29 and 30 of 1 to 1.5, the hydraulic pressure required in chamber 34 against piston 30 is twice the differential pressure between the hydrostatic head and the pore pressure in order to equal the force exercised by the pressure differences against piston 30 in chamber 35 due to the piston area ratio. Consequently when the pressure differential between hydrostatic head and pore pressure is 50 p.s.i. or less, a pressure reading cannot take place because the hydraulic pressure required to press the plunger 25 against the wall of the borehole 28 is 100 p.s.i. This same hydraulic pressure prevails in chamber 34 and exercises a force of 50 lbs. against piston 30 which is equal to the force exercised to piston 30 in chamber 35 by the differential pressure. Consequently in this case, the dual piston 29–30 will move away from the wall of the borehole 28 with the slightest overpressure in chamber 34 and no pressure reading can be taken. If, however, the differential pressure is 500 p.s.i. as indicated in FIGURE 6, the hydraulic pressure required to move the dual piston 29–30 is somewhat more than twice 500 or slightly more than 1000 p.s.i.

When the hydraulic pressure has overbalanced (FIGURE 4) the differential pressure, the pistons 29–30 will suddenly move and the hydraulic pressure drops until the piston 30 hits the back of chamber 35 at which time the pressure would then normally start to increase again as more pressure is applied at the surface. Actually, however, the displacement and hence the increased volume accompanying this movement is so small relative to the volume of mud in the drill pipe that the change in pressure caused by the movement would normally be dampened out by expansion of the fluid and contraction of the pipe. When the dual piston strokes fully inward, however, channel 38A is opened, causing the pressure in chamber 34 to bleed to the pressure in the annulus and the slight drop in pressure at the surface becomes evident. The maximum indicated surface pressure then corresponds to the difference between the hydrostatic and the formation pore pressure. Since the bleed is relatively slight it will still be possible to break the rupture plate 15 by increased pressure from the mud pump when desired.

When the hydraulic pressure is subsequently released and bled off at the surface or the breaking plate 15 in the bushing 14 is broken by exerting sufficient pressure with the mud pump (drilling pump), e.g., 2000 p.s.i., the forces holding the dual piston 29–30 in the position shown in FIGURE 4 are released and the dual piston 29–30 is pushed outwardly in the plunger 25 by means of the small helical spring 40 attached to the head of the piston 30 in chamber 25. This causes channel 39 to be closed off by the piston 29 and channel 38A to be closed off by piston 30, resulting in the dual piston 29–30 being situated as in FIGURE 1.

It should be noted that when the breaking plate 15 in bushing 14 is ruptured, the shut off in the drill pipe is removed and the pressure gradually disappears through the nozzles of the drilling bit. This gradual dropping off of the pressure takes place because of the rather small diameters of the drilling bit nozzles. Consequently the stronger helical spring 22 will expand first, pushing the plunger 25 back into the sleeve 18 as shown in FIGURE 1, and then the weaker helical spring 4 will push the sliding sleeve 5 upward until the lock spring 8 engages groove 9. Drilling or other operations can then be continued.

Figure 5:
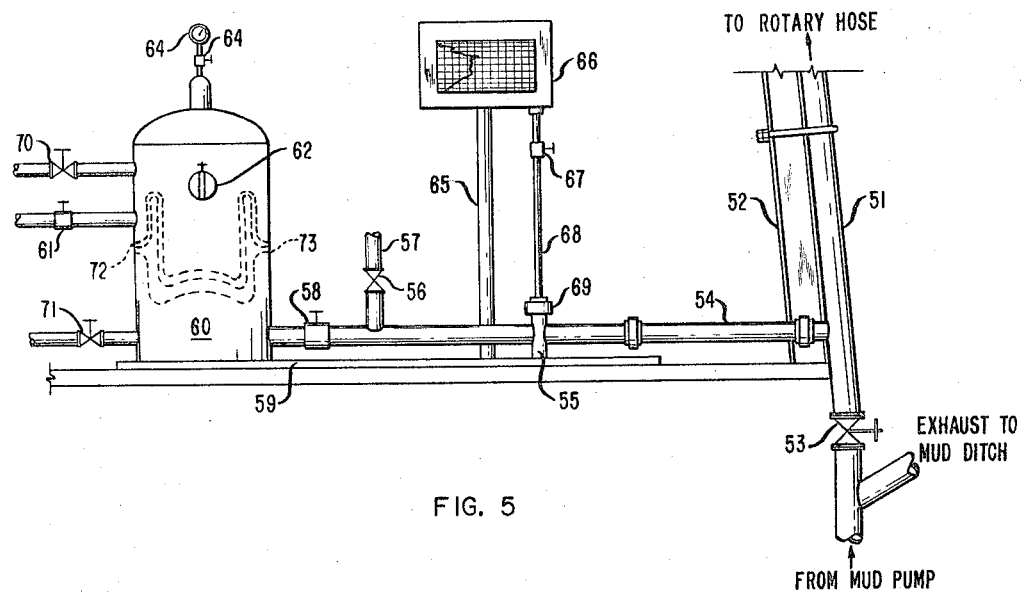
FIGURE 5 shows the surface equipment required to obtain the records and to register the pressure curve.

Referring now to FIGURE 5, there is shown schematically, the surface equipment necessary to operate the sensing apparatus and to register the pressure curve. In order to supply the regulated pressures necessary, a high pressure steel accumulator 60 is divided into two compartments by a diaphragm 72 which is supported by a perforated steel plate 73. Connected to the accumulator 60 above the diaphragm 72 is a valve 70 which is connected to one or more nitrogen cylinders (not shown) which are provided with the usual pressure gauges and pressure regulators. Also installed on the accumulator 60 above the diaphragm 72 are a safety relief valve 61 which operates when the pressure exceeds a preset value, e.g. 1500 p.s.i.; a bleed off valve 62; and, a needle valve 63 connected to a pressure gauge 64.

Below the diaphragm 72, an inlet with a high pressure valve 71 is installed. This inlet is connected with a high pressure water pump (not shown). Also provided below the diaphragm is an outlet with an injector valve 58 which is of the needle type and allows passage of only a very small quantity of water at a time. The output from the valve 58 is connected to the well by means of a pipe 54 which in turn is connected to the conventional well standpipe 51 attached to the derrick 52.

Prior to taking pressure reading the accumulator 60 is precharged with nitrogen over the diaphragm to a pressure of, for example 900 p.s.i., after which water is pumped in through inlet valve 71 up to a pressure of for example 1500 p.s.i., compressing the nitrogen above the diaphragm to the same pressure. The injector valve 58 is closed during the charging of the accumulator. The nitrogen cylinder connected to the accumulator is provided with a pressure regulator being set at 1500 p.s.i. keeping a constant pressure above the diaphragm and also on the water below the diaphragm. When a pressure reading has been taken the accumulator must be set again for the next reading. This can be done by again pumping water through valve 71 until the pressure reaches 1500 p.s.i. The accumulator is then ready for the next reading.

Connected to the pipe 54 between the injector valve 58 and the standpipe 51 is an automatic relief valve 56 which in the illustrated example, opens at 300 p.s.i., releases fluid until a pressure of 100 p.s.i. is reached, and then closes automatically. The valve 56 can also be completely closed and opened by manual operation. The fluid released through the valve 56 is bled off via bleed-off line 57.

Connected to the pipe 54 between the relief valve 56 and the standpipe 51 is a union 55 having a rubber diaphragm 69 mounted therein. The union 55 is connected via a small diameter steel pipe 68 provided with a needle valve 67 to a hydraulically operated registrating pressure recorder or indicator 66 which is supported and mounted on the steel support 65. The small diameter steel pipe 68 above the diaphragm 69 is completely filled with hydraulic fluid which is utilized to operate the registrating pressure indicator or recorder 66. The diaphragm 69 transduces the pressure prevailing in the line 54 connecting the injector valve 58 to the standpipe 51, which forms the connection with the drill pipe via the high pressure rotary hose and the kelly (both standard equipment).

To achieve a direct reading of the differential pressure, the calibration of the paper roll on the recorder 66 should, in the prescribed case, be such that the registrated pressure is one-half of the actual pressure applied. For example, when 500 p.s.i. hydraulic pressure is actually applied, only 250 p.s.i. should be registered. The reason being that the area ratio between piston 29 and 30 in the downhole recorder is 1 to 1.5 as explained above and illustrated in FIGURES 6 and 7 which shows the complete sequence of the pressure variations when taking a reading for the differential pressure.

It should again be noted however that the foregoing dimensions and pressure are merely by way of example and that any desirable ratio between the areas of pistons 29 and 30 may be used providing that piston 30 has the greater area.

The operation of the "differential pressure recorder" will now be described. After the accumulator has been charged as described above, the kelly (not shown) is connected above the derrick floor and the bushing 14 inserted into the drill pipe. Thereafter, the kelly is reconnected and the drill pipe lowered until the collar 1 is positioned down the hole opposite the formation where the "differential pressure" is to be measured. Once the bushing 14 with breaking plate 15 is inserted into the drill pipe and the apparatus is at the desired spot the drill pipe may not be moved or rotated.

With valve 53 open and valves 56 and 58 closed, the mud or drilling pump (not shown) is started and mud is pumped via the standpipe 51 (FIGURE 5), rotary hose and kelly into the drill pipe. The mud stream in the drill pipe will then force bushing 14 (FIGURE 1) down the drill pipe. The pumping pressure in the illustrated example should not exceed 250 p.s.i. After some time the bushing 14 will seat in the sliding sleeve 5 (FIGURES 1 and 2), causing the pump pressure to increase and the relief valve 56 (FIGURE 5) to open at 300 p.s.i. and release the pressure in the line 51 until it reaches 100 p.s.i. whereupon the valve 56 again closes. At this time, the sliding sleeve 5 is still locked by the lock spring 8 in groove 9 as unlocking requires a pressure of 350 p.s.i. Standpipe valve 53 and relief valve 56 (FIGURE 5), still holding 100 p.s.i. pressure, are then manually completely closed and injector valve 58 is opened. Small quantities of water are then pressed from the accumulator 60 (FIGURE 5) through the injector valve 58 and into the drill string via the line 54, causing the pressure inside the drill pipe to increase until it reaches 350 p.s.i. at which time the lock spring 8 (FIGURE 1) snaps out of groove 9 (FIGURES 1 and 2) and the pressure in the drill string decreases (see FIGURE 7).

As the pressure begins to increase again and reaches 20 p.s.i., the sliding sleeve 5 (FIGURE 2) with the bushing 14 inside, begins to move downward compressing the helical spring 4 which is fully compressed at 50 p.s.i. The aperture 13 (FIGURE 2) is now open and mud flows via the slits 50 through the aperture 13 and into the cavity 37 behind the plunger 25.

The injection of water at the surface is continued by the accumulator and the pressure increases until it is 60 p.s.i. as required to start compressing the helical spring 22, causing the plunger 25 to start moving toward the wall of the borehole. Mud flows between the helical spring 22 into chambers 34 and 35 and dual piston 29–30 moves toward the wall of the wellbore without requiring a further pressure increase.

As the pressure increases from 60–100 p.s.i., plunger 25 moves outward and pierces the mudcake 28. Now, when the plunger has reached its most outward position, the net pressure in chamber 34 pushes the dual piston 29–30 inward against the hydrostatic pressure prevailing behind piston 30 in chamber 35 causing piston 29 in chamber 27 to move away from the wall of the borehole and the pressure in chamber 27 to be reduced to the formation pressure.

Figure 7:
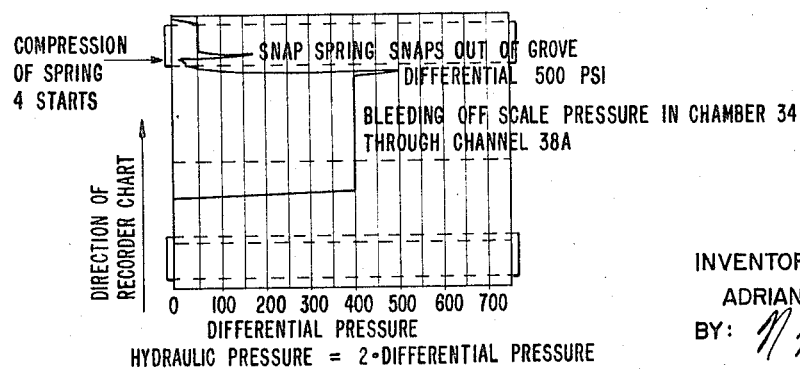

If, as shown in the example illustrated in FIGURE 6, the formation pore pressure prevailing in the recording chamber 27 is 5000 p.s.i., and the hydrostatic pressure behind piston 30 in chamber 35 is 5500 p.s.i., then due to the area ratio of pistons 29 and 30 being 1 to 1½, the force required to move the piston 29 away from the wall of the borehole is 500 lbs. Therefore, the pressure required in chamber 34 behind piston 30 to produce this 500 lbs. of force is 1000 p.s.i. (FIGURES 6 and 7). Water is therefore steadily injected by the accumulator 60 (FIGURE 5) and the pressure increased to 1000 p.s.i.

Upon reaching the overbalance pressure in chamber 34, the dual piston 29–30 will move inward without further resistance and the pressure drops suddenly until the dual piston reaches the end of its stroke, thereby opening the channel 38A and bleeding off the pressure in chamber 34 to the annulus 12, producing a slight pressure drop at the surface. The maximum recorded pressure is then the pressure differential between the formation pressure and the hydrostatic pressure. Once the channel 38A is open, the registering pressure recorder draws a straight line as shown in FIGURE 7. To repeat the recording for checking purposes the injector valve 58 is closed and the relief valve 56 completely opened and all pressure bled off. Hereafter the relief valve 56 must be closed completely and the injector valve 58 opened. A second reading is then immediately in progress.

To put the sensing apparatus down the hole out of operation the valves 56, 58 and 67 are closed. Valve 53 is then opened, the mud pump (drilling pump) put slowly into operation; and the pressure in the drill string built up until the breaking plate 15 in bushing 14 breaks (FIGURE 4) at about 2000 p.s.i., after which pressure drops and the pump is brought to a standstill. Other operations can then be continued.

It should be noted that while the invention is directed to measuring the difference between hydrostatic and pore pressure, that the actual formation pore pressure can easily be calculated from the differential pressure when specific gravity or density of the mud and depth are known at the position where recording took place. However, information on the pore pressure itself is in most cases of minor importance.

Obviously various modifications of the above-described invention can be made in light of the disclosure. It is therefore to be understood that the invention is not limited to the particular form illustrated but is capable of embodiment in other forms without departing from the spirit and scope of the appended claims.

I claim as my invention:

1. Apparatus for measuring the pressure differential between the hydrostatic pressure of the mud column existing in a borehole annulus and the formation pore pressure at the same depth comprising:
   (a) a drill string;
   (b) a tubular member connected in said drill string and forming a portion thereof, said tubular member having a transverse cavity formed in the wall thereof which is open to the annulus of the well and communicates with the interior of said tubular member through an aperture;
   (c) means mounted within said tubular member for selectively opening and closing said aperture;
   (d) a cylinder having one closed end slidably mounted in a fluid-tight manner within said transverse cavity, the end of said cylinder adjacent the wall of said borehole forming an open funnel shaped chamber;
   (e) a pair of pistons of different diameters centrally mounted within said cylinder in fluid-tight relationship therewith for movement along the axis of cylinder, said pistons being rigidly joined together with the smaller of said pistons extending into said funnel shaped chamber;
   (f) first channel means for providing communication between the annulus and a first chamber formed between the large piston and the closed end of said cylinder;
   (g) second channel means for providing communication between a second chamber, which is formed by the wall of said cylinder and the end of said large piston which is connected to said small piston, and the interior of said tubular member via said aperture; and
   (h) a third channel, communicating with said second chamber, said third channel being closed when said large piston is in its normal position, said third channel also communicating with said first channel.

2. The apparatus of claim 1 wherein said means for selectively opening and closing said aperture comprises:
   (a) a sleeve slidably mounted within said tubular member, said sleeve being normally positioned to seal said aperture;
   (b) means seated in said sleeve for blocking the flow of fluid through said drill string; and
   (c) means located at the surface of said borehole and connected to the interior of said drill string for increasing the pressure in said drill string above said sleeve, whereby said sleeve is forced downward and said aperture is opened.

3. The apparatus of claim 1 wherein the ratio of the areas of said pistons is 1:1½.

References Cited

UNITED STATES PATENTS 2,740,695   4/1956   Buckley _____ 73—152 X
2,855,780   10/1958   Edwards _____ 73—152 X RICHARD C. QUEISSER, *Primary Examiner.*

JAMES J. GILL, *Examiner.*

J. W. MYRACLE, *Assistant Examiner.*